(12) United States Patent
Cannata (10) Patent No.: US 8,827,722 B1
(45) Date of Patent: Sep. 9, 2014

(54) TABLET APPARATUS

(76) Inventor: Michael Scott Cannata, Sandwich, MA (US)

(*) Notice: Subject to any disclaimer, the term of this patent is extended or adjusted under 35 U.S.C. 154(b) by 435 days.

(21) Appl. No.: 13/205,593

(22) Filed: Aug. 8, 2011

Related U.S. Application Data (63) Continuation-in-part of application No. 12/356,551, filed on Jan. 21, 2009, now Pat. No. 7,992,317.

(60) Provisional application No. 61/011,637, filed on Jan. 18, 2008.

(51) Int. Cl.
*B43L 1/00* (2006.01)

(52) U.S. Cl.
USPC .................................................. 434/408

(58) Field of Classification Search
USPC ......... 434/408, 421, 422, 423, 424, 425, 428; D19/52
See application file for complete search history.

(56) References Cited

U.S. PATENT DOCUMENTS

| | | | | |
|---|---|---|---|---|
| 3,149,426 | A * | 9/1964 | Kaeyer | 434/410 |
| 5,743,414 | A * | 4/1998 | Baudino | 211/69.1 |
| 6,736,644 | B1 * | 5/2004 | Vaughn | 434/408 |
| D496,068 | S * | 9/2004 | Mandel | D19/36 |
| D507,302 | S * | 7/2005 | Chen et al. | D19/52 |
| 6,945,785 | B2 * | 9/2005 | Sohl et al. | 434/408 |
| D534,214 | S * | 12/2006 | Marcy et al. | D19/52 |
| 7,293,993 | B2 * | 11/2007 | Fedorov et al. | 434/408 |
| 7,874,842 | B2 * | 1/2011 | Beno | 434/408 |
| 8,556,637 | B2 * | 10/2013 | Domey et al. | 434/408 |
| 2003/0079389 | A1 * | 5/2003 | Eberly | 40/586 |
| 2010/0267001 | A1 * | 10/2010 | Sugai | 434/408 |

* cited by examiner

*Primary Examiner* — Kurt Fernstrom

(57) ABSTRACT

A tablet apparatus that includes at least one information storage component and at least one protection component. The tablet apparatus can be either temporarily or permanently affixed to an exterior surface.

20 Claims, 10 Drawing Sheets

TABLET APPARATUS

RELATED APPLICATIONS

This continuation-in-part utility patent application claims priority to the following patent applications, the contents of which are hereby incorporated by reference in their entirety: (1) a provisional patent application titled "'TABLITAPE' 'TABLET TAPE' OR 'TABLITAPE'—a modified measure housing providing for writing or tablet area for retention of multiple dimensions fractions or drawings" (Ser. No. 61/011,637) that was filed on Jan. 18, 2008; and (2) a utility patent application titled "TAPE MEASURE APPARATUS" (Ser. No. 12/356,551) that was filed on Jan. 21, 2009.

BACKGROUND OF THE INVENTION

The invention relates generally to information storage devices. More specifically, the invention is a tablet apparatus for storing and accessing information (the "apparatus" or "tablet").

The ability to accurately record information and to later access that recorded information can be very beneficial to users in a wide variety of different operational contexts. Unfortunately, many approaches for storing and retrieving information such as a using a writing instrument such as a pen or pencil to write on a conventional note pad or even an adhesive-backed note pad, are designed for a traditional office environment. Such approaches involve significant limitations outside the traditional office environment.

A scuba diver cannot simply pull out a paper notepad and pencil to make some notes while 10 feet underwater. A skilled tradesman working on the construction of a sky scrapper cannot simply jot down measurements on an adhesive-backed note pad and attach it to the side of a tool, tape measure or wall of the building when the work space is exposed to the elements of wind and weather. Even the machinist on the plant floor can benefit from the use of instrumentation for the recording and retrieval of information that does not presume traditional office conditions.

In many contexts, the person desiring to store information is already doing something with their hands. The ability to either temporarily or permanently attach the information storage device to something else can make the difference between an information storage device that is useful in practice and an information storage device that is essentially impractical to use in a particular context.

Outside a general office environment, the limitations of space can be significant because a person only has so many pockets and so many hands. Information storage devices are of little use if they cannot be conveniently accessed when the information is to be stored or accessed. Despite the limitations of space, space is nonetheless often underutilized. There are many items, whether fully portable, somewhat moveable, or fully fixed with unused surface areas. The reasons underlying the failure to more fully utilize unused surface area are largely grounded in history as well as the predominant focus on conventional office environments to the exclusion of the challenges faced in particular niche environments.

A conventional office environment does not involve wind, rain, or other types of weather. Outside a conventional office environment, there are many instances where an information storage device will be subjected to such conditions. Thumbtacks are suitable for sticking a note to a board, but are not well suited to attach a piece of paper to a tape measure. Even relatively recent technologies such as adhesive-backed note pads do not hold up well when subjected to the elements.

Conventional tools for recording and storing information are resistant to change in part because the traditional office environment is the largest market for such technologies. Operating environments such as under water or even construction and manufacturing settings are perceived as constituting market niches that may be perceived as too small to merit or support specialized alternatives to general office technologies. Moreover, environment-specific obstacles in using general purpose tools are significantly underestimated by those individuals who do not personally experience such obstacles. For example, the need to carry separate devices for capturing measurements and then recording those measurements may not be perceived as sufficiently burdensome to merit product innovation. Thus the absence of integrated tools is not fully appreciated by many of ordinary skill in the art.

SUMMARY OF THE INVENTION

The invention relates generally to information storage devices. More specifically, the invention is a tablet apparatus for storing and accessing information (the "apparatus" or "tablet").

The apparatus can include one or more information storage components, such as an erasable writing surface. The apparatus can also include one or more a protection components such as a rubber rim to prevent scratching or other damage to the information storage component.

The apparatus can be implemented in a wide variety of different embodiments that are suited for a wide variety of different operating environments. The apparatus can be configured to be either temporarily fixed or permanently fixed to a wide variety of different host devices and environments.

The apparatus can be more fully understood upon reading the accompanying drawings that are discussed briefly below.

BRIEF DESCRIPTION OF THE DRAWINGS

The following drawings illustrate different examples and embodiments of the apparatus.

The apparatus can be more fully understood upon reading the following detailed description.

DETAILED DESCRIPTION

The invention relates generally to information storage devices. More specifically, the invention is a tablet apparatus for storing and accessing information (the "apparatus" or "tablet").

The apparatus can be implemented in wide variety of different configurations. In accordance with the provisions of the patent statutes, the principles and modes of operation of this invention have been explained and illustrated in preferred embodiments. However, it must be understood that this invention may be practiced otherwise than is specifically explained and illustrated without departing from its spirit or scope.

I. Overview

Figure 1A:
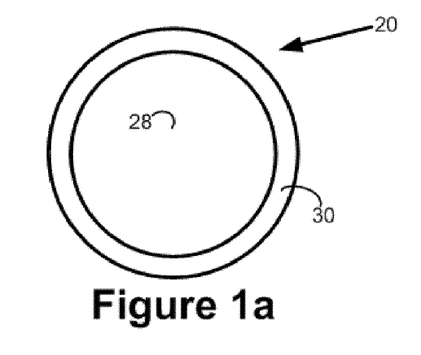
FIG. 1a is top plan view illustrating an example of an apparatus adapted to be either temporarily or permanently fastened to a host.
Figure 1B:
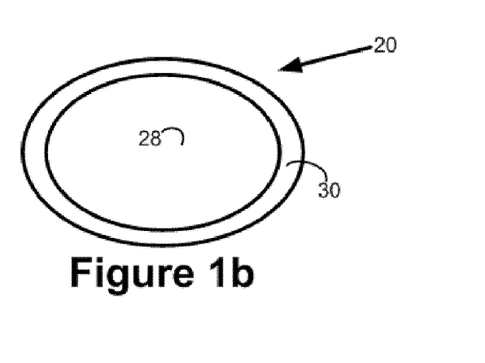
FIG. 1b is top plan view illustrating an example of an apparatus adapted to be either temporarily or permanently fastened to a host.
Figure 1C:
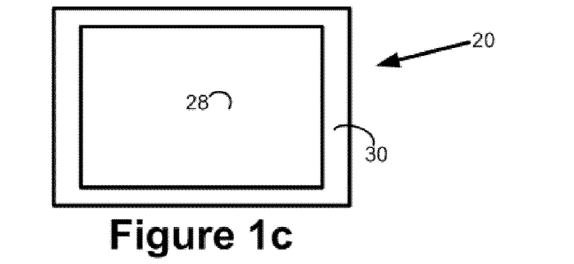
FIG. 1c is top plan view illustrating an example of an apparatus adapted to be either temporarily or permanently fastened to a host.

FIG. 1a is a top plan view diagram illustrating an example of the apparatus 20 embodied in a substantially circular shape. As illustrated in FIGS. 1b and 1c, the apparatus 20 can be implemented in a wide variety of different shapes, sizes, and material compositions.

The apparatus 20 provides users with the ability to store and retrieve information. The apparatus 20 can include one or more information storage components 28 for the recording and storing of information. The apparatus 20 can also be configured to include one or more protection components 30 that protect the exterior surface of the information storage component 28.

In many embodiments of the apparatus 20, the information storage component 28 will be comprised of a flat or substantially flat writing surface on which the user can write down information. Other embodiments of the apparatus 20 can include alternative mechanisms for information storage such as electronic data captured from a touch screen or even non-visual information such as an audio recording.

In many embodiments of the apparatus 20, the protection component 30 will be comprised of a rubber rim that forms a continuous or substantially continuous loop around the information storage component 28. In many embodiments of the apparatus 20, the rim protrudes outward from the information storage component 28 in a uniform or substantially uniform distance from the information storage component 28. The degree to which the information storage component 28 is covered by the protection component can vary substantially in different embodiments of the apparatus 20.

Figure 1D:
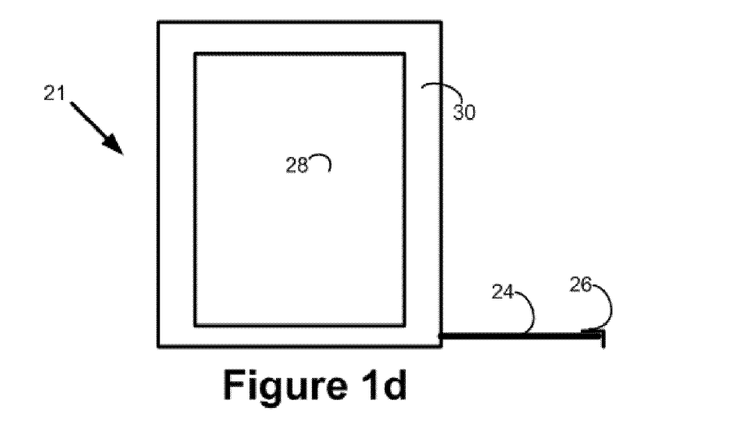
FIG. 1d is a front plan view illustrating an example of the apparatus of FIG. 1c attached to a tape measure as a host device.

FIG. 1d is a side plan view illustrating an example of a tape measure host device 21 with the apparatus 20 attached. The bottom and thus unseen surface of FIG. 1c is attached to the front surface of the tape measure host device 21 such that the top plane view of the apparatus 20 now dominates the front view plan view of the integrated host device 21.

The diversity of potential host devices 23 is substantial. In some embodiments, the apparatus 20 will be specifically customized for use with a particular host device 21. In other embodiments, a particular embodiment of the apparatus 20 can be intended to function in conjunction with a wide variety of different potential host devices 23. In some instances, the apparatus 20 will be permanently fixed to the particular host device 21. In other embodiments, the apparatus 20 can be temporarily fixed to a particular host device 21, permitting the apparatus 20 to be moved to other host devices 21. A single host device 21 can have more than one attached apparatus 20. For example, the rear surface of the tape measure host device in FIG. 1d could include an additional attached apparatus 20.

Figure 3:
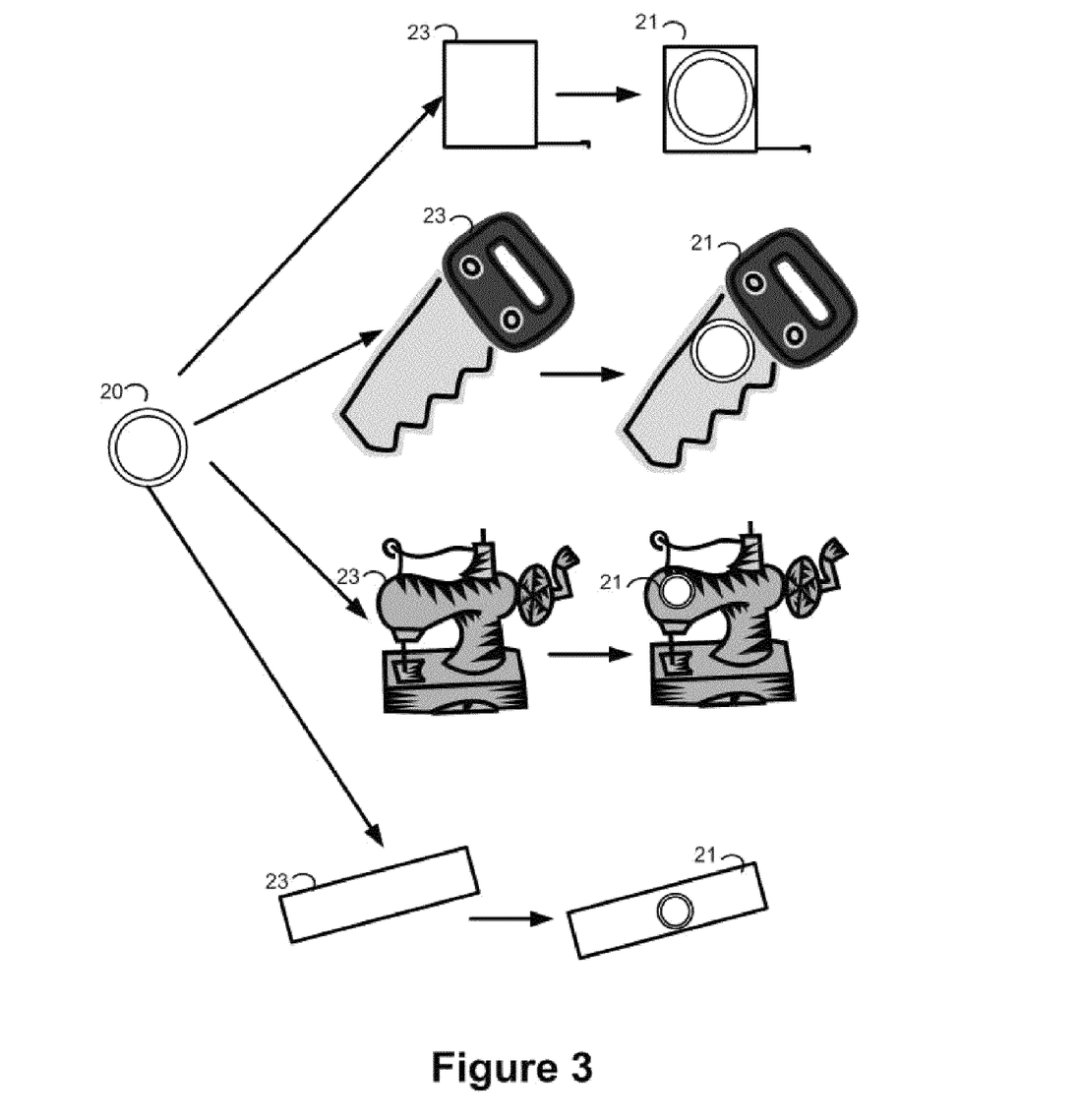
FIG. 3 is a block diagram illustrating different examples of host locations for the apparatus.

FIG. 3 illustrates a couple of different categorical examples of potential host devices 23. Measurement devices (such as a tape measure 23), portable tools (such as a saw 23), machines (such as a sewing machine 23), and articles of clothing (such as a diving strap 23) can serve as potential host devices 23 for the apparatus 20.

The apparatus 20 provides users with the ability to consolidate the number of items they need to carry or access in particular contexts. For example, instead of using a tape measure to capture measurements that are written down on pad of paper, the tape measure host device 21 can include the apparatus 20 which has an erasable writing surface or other form of information storage component 28 to record the measurements. Some embodiments of the apparatus 20 can include a writing instrument holder for holding the writing instrument and even a tether to make sure that the writing instrument is not unintentionally severed from the apparatus 20.

The consolidation of items accomplished by use of the apparatus 20 can be further enhanced by the operational characteristics of the apparatus 20. For example, a pad of paper cannot be used underwater regardless of whether the pad of paper is attached to something else or not. Many contexts for information capture and storage involve environments that are harsher than a typical office environment. Whether the harshness of a particular environment results from exposure to natural elements, man-made manufacturing contexts, or simply unusual operating environments such under water or outside the earth's atmosphere, the harshness or even inconvenience of an operating environment can be a significant obstacle to efficient information collection, storage, and retrieval. For example, a conventional dry erase marker may not well suited for hot, humid, or damp operating environments. Meanwhile, those of ordinary skill in the art do not seem inclined to utilize materials such as anodized metal (including but not limited to anodized aluminum) or thermoset plastic (such as ®FORMICA) as writing surfaces for conventional office, educational, or living environments.

The apparatus 20 can be implemented in a manner that supports robust functionality while at the same time making the apparatus 20 itself sufficiently resilient to serve as a product that lasts and provides effective functionality and value over time.

A wide variety of different writing instruments and writing surfaces can be incorporated into the apparatus 20. Some writing instruments can utilize standard writing instruments such as pens, pencils, dry markers, etc. Other embodiments could utilize specialized writing instruments specifically designed for the particular writing surface and operational context. Still other embodiments of the apparatus 20 can include electronic writing surfaces such as touch screens, a light pen, a stylus, etc. or even non-visual forms of information such as audio that is playable or recordable on an MP3 player.

In many embodiments of the apparatus 20, a conventional writing instrument can be used to write on an information storage component 28 that includes a writing surface. The apparatus 20 can be configured not to smudge, while at the same time permit the writing to be erased by the purposeful rubbing of the writing with a human hand. Such an embodiment will typically utilize a writing surface that is comprised of either thermoset plastic or an anodized metal such as anodized aluminum.

II. Introduction of Elements and Definitions

The apparatus 20 can be described and defined with respect to certain elements and components.

A. Host

A potential host 23 for the apparatus 20 is any location (typically a flat or substantially flat exterior surface) that permits the apparatus 20 to be either temporarily or permanently fixed to a surface that is accessible and not part of the apparatus 20, i.e. any surface that permits apparatus 20 to be attached.

The apparatus 20 can be either temporarily or permanently attached to potential hosts 23 that are fully portable items (such as tools, articles of clothing, measurement devices, personal mementos, machines, vehicles, etc.), semi-movable items (such as appliances, fixtures, large machines, industrial equipment, etc), as well at inherently fixed locations and structures (such as walls, roads, ceilings, roofs, etc).

1. Host Surface/Host Housing Component

Any surface to which the apparatus 20 is attached can be referred to as a host surface. In many embodiments of the apparatus 20, the host surface is an external surface of a housing component 22 of the host device 21. For example, a tape measure device 21 will typically include a roll of measuring tape 24 that is stored within a housing component 22 that provides the exterior surface of the tape measure device 21.

In some embodiments of the apparatus 20, the host surface is flat or substantially flat, but a wide variety of geometric configurations can be used. The more unusual the geometry of the host surface, the more likely that a customized apparatus 20 is required.

The apparatus 20 can be specifically configured for attachment to a specific exterior surface on the host 21. In other embodiments, the apparatus 20 is not customized for a particular operating environment.

Figure 6A:
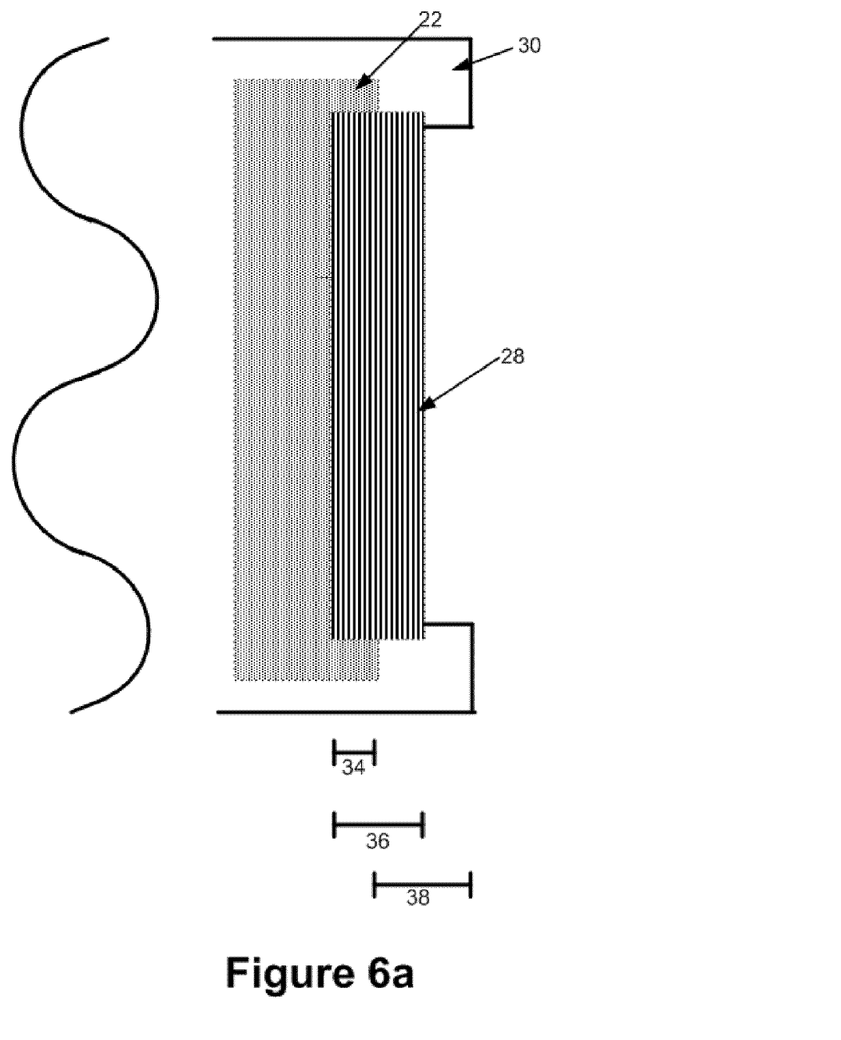
FIG. 6a is a block diagram illustrating an example of a cross-section view of an information storage component from the rear that is inset within a housing component surface.
Figure 6B:
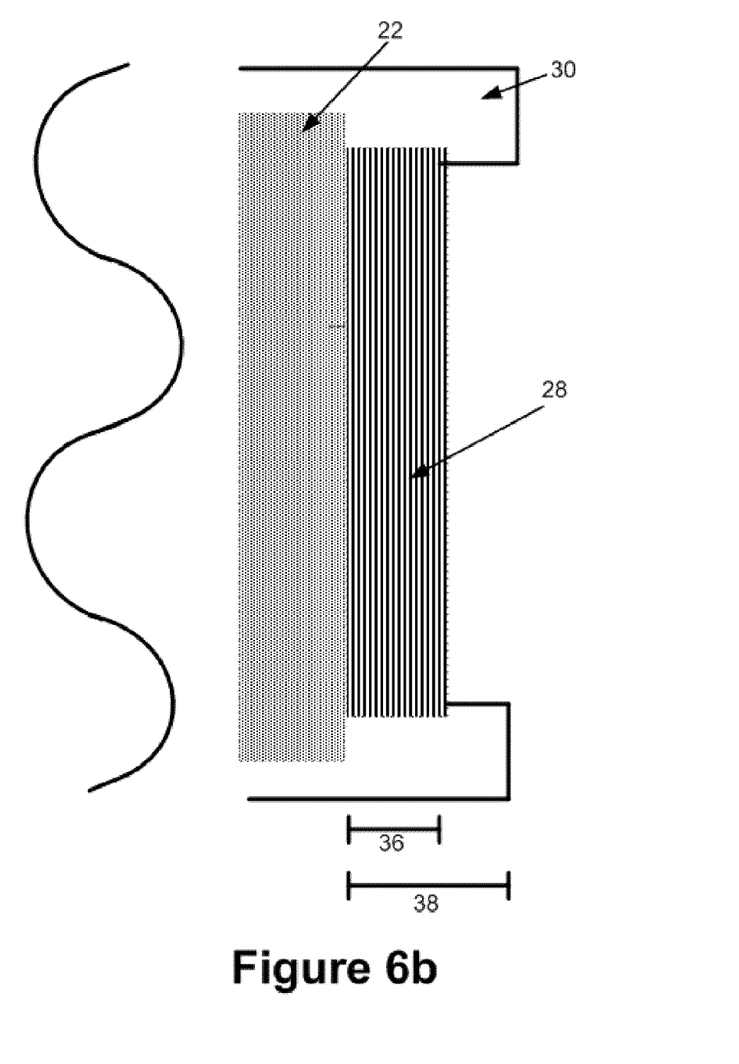
FIG. 6b is a block diagram illustrating an example of a cross-section view of an information storage component from the rear that is not inset within a housing component surface.

In many instances, the host surface is accurately characterized as a "housing" or "housing component" of the potential host device 23, such as a housing 22 of a tape measure device 23. In an embodiment of the apparatus 20 that is configured to be permanently attached to a particular host device 21 rather than merely temporarily fixed to a particular host device 21, the housing component 22 of the device 23 can be structurally integrated with respect to the protection component 30 of the apparatus 20 to enhance the structural strength of the apparatus 20. FIGS. 6a and 6b illustrate examples of such an integrated structure. In many instances it is important to distinguish the exterior surface of the potential host 23 from the exterior surface of the apparatus 20. However, such distinctions tend to be particularly important when the apparatus 20 is only temporarily fixed to the host 21.

2. Host Connector/Host Connector Component

Some but not all potential host devices 23 will include a host connector 32 or connector component 32 that services to either temporarily or permanently fix the potential host 23 to a particular location. Examples of connector components 32 include belt clips 32 on a tape measure 23, a fabric-based fastening tape 32 (such as what is marketed under the VELCRO® trademark) on a strap 23, zippers, snaps, clasps, magnets, tape, adhesive, etc. The connector component 32 relates to fixing the position of the potential host device 23 with respect to the host environment and should not be confused with an attachment component 31 (defined below) which relates to the fixing of the apparatus 20 with respect to a particular location on the potential host device 23. Some embodiments of the apparatus 20 can involve a host 21 without a host connector 32.

3. Host Environment

The apparatus 20 can be configured for convenient use in a wide variety of different operating environments, including but not limited to: under water (such as on a strap 21 for scuba divers); at a construction site that exposed to the weather and other environments (such as a tape measure 21 or a mobile tool), outer space, a manufacturing facility (such as an milling machine), other non-office environments, or even just a wall in a conventional office environment.

B. Apparatus

The apparatus 20 can configured for use in a wide variety of different host environments and comprised of a wide variety of different component configurations. Each apparatus 20 must include at least one information storage component 28 and at least one protection component 30. In some embodiments, the protection component 30 also serves as an attachment component 31. Many embodiments of the apparatus 20 will be shaped to accommodate the geometry of the potential host 23. The apparatus 20 can be used with potential hosts 23 such a tool casings, housings, tabletops, subframes, tape measures, straps, articles of clothing, and virtually any item or location that possesses a surface that can accommodate the apparatus 20.

Some embodiments of the apparatus 20 can include a writing instrument holder and/or a writing instrument tether. This can be used to facilitate the user's ability to keep a writing instrument such as a pen, pencil, dry erase marker, or stylus easily and conveniently accessible.

1. Information Storage Component

The apparatus 20 can include one or more information storage components 28. Some information storage components 28 are manual (such as an erasable writing surface), while others can be electronic (such as a computer touch screen connected to a central processing unit or some type of network). Many information storage components 28 are visually based (see above), but information storage components 28 can also be used to store and access non-visual attributes, such as sound. Information storage components 28 can include but are not limited to erasable writing tablets, digital sound recorders/players, light emitting diode (LED) displays, touch screens, voice recognition applications, computer processors, or any combination thereof. Virtually any other information storage technology can be adapted for use as part of the apparatus 20. Some embodiments of the apparatus 20 will include more than one information storage component 28, and some of those embodiments can include more than one type of information storage component 28. For example, a single embodiment of the apparatus 20 could include an erasable writing tablet configured for use with a pencil, a touch screen, and an MP3 player/recorder as information storage components 28.

A common embodiment of the apparatus 20 can include an erasable writing surface as the information storage component 28. Such a writing surface can be made up of a wide variety of materials, including but not limited to a metal, an anodized metal (such as anodized aluminum), plastic, acrylic, vinyl, thermoset plastic, fiberglass, and other similarly behaving materials. In many preferred embodiments, the writing tablet will be comprised of either anodized metal (such as anodized aluminum) or thermoset plastic. In an underwater embodiment of the apparatus 20, it is often desirable to use an erasable writing tablet comprised of anodized metal. The material composition of the apparatus 20 can be customized for use in a particular host environment.

In many embodiments of the apparatus 20, the material for the writing surface is selected so that a conventional graphite pencil will make clear marks on the erasable writing surface that are not subject to smudging, while still allowing a human hand to apply pressure to the surface to comprehensively and conveniently erase the surface. The tablet should not smudge, or at least not smudge easily. However, pressure from a human hand (coupled with the natural oils of human skin) should fully erase the markings without leaving a trace or ghost of the erased image. Different embodiments of the apparatus 20 can be configured for different writing utensils made of different materials. Electronic tablets may require use of a stylus, while a touch screen or MP3 player would not require a utensil of any kind.

With respect to embodiments of the apparatus 20 utilizing an erasable writing surface as an information storage component 28, the surface can vary widely from embodiment to embodiment with respect to shape, height, width, thickness, and other properties. In many embodiments, the erasable writing surface should have a shape that is similar to shape of the housing component 22 to which it is fastened because this will maximize the space available for the storage of information. Thus, a rectangular surface is often desirable with respect to a rectangular shaped side surface for the housing component 22, a circular surface is often desirable with respect to a circular shaped side surface, and so on and so forth. In many embodiments, the surface area of the writing surface will cover at least about 70% of the particular surface area of the side of the host. In other embodiments, that number could vary between about as low as 20% and about as high as about 95%, and virtually any percentage in between.

Figure 2A:
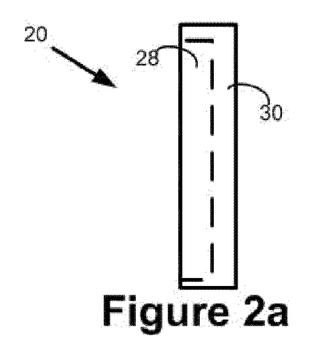
FIG. 2a is a side plan view for the apparatuses of FIGS. 1a, 1b, and 1c in which the rear surface of the information storage component is not covered by the protection component.
Figure 2B:
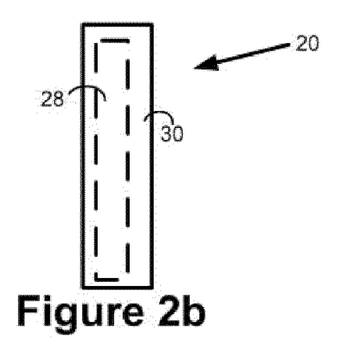
FIG. 2b is a side plan view for the apparatuses of FIGS. 1a, 1b, and 1c in which the rear surface of the information storage component is covered by the protection component.

In the side views of FIGS. 2a and 2b (views that can coincide with the apparatus 20 illustrated in FIGS. 1a, 1b, and 1c), the writing surface is not directly visible because of the continuous or substantially continuous rim (i.e. the protection component 30) forming a loop around the writing surface and protruding outward from the writing surface. Thus, in FIGS. 2a and 2b, the writing surface serving as the information storage component 28 is illustrated using dotted lines. The difference between the embodiment illustrated in FIG. 2a from the embodiment illustrated in FIG. 2b is that the protection component 30 in FIG. 2b fully surrounds the back portion of the writing surface while in FIG. 2a the protection component 30 (typically a rim or a jacket that includes a rim) does not cover the back portion of the information storage component 28.

Figure 2C:
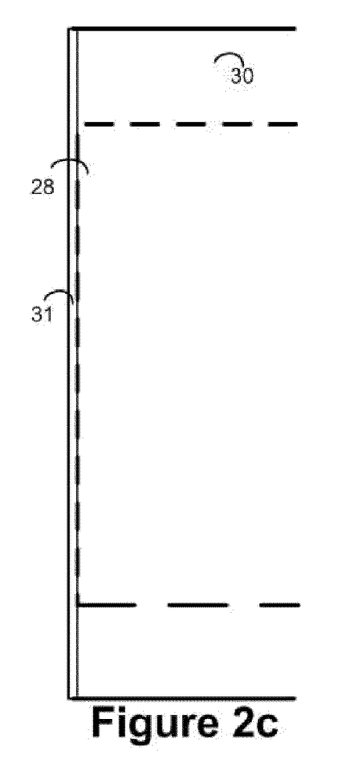
FIG. 2c is a partial zoomed-in view of FIG. 2a, illustrating an example of an apparatus for which the rear surface area of the information storage component is in direct contact with an attachment component, not the protection component.
Figure 2D:
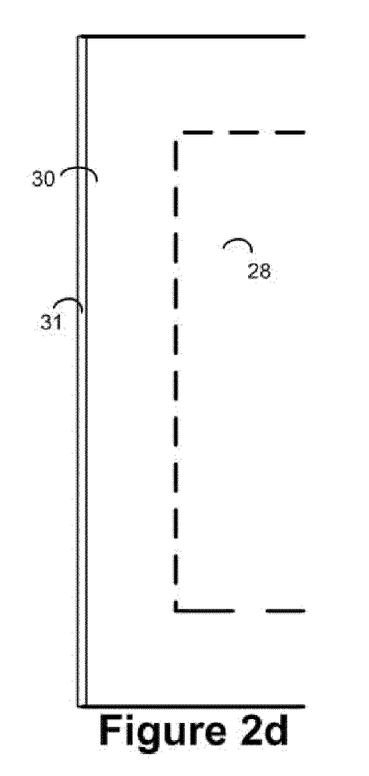
FIG. 2d is a partial zoomed-in view of FIG. 2b, illustrating an example of an apparatus for which the rear surface area of the information storage component is not in direct contact with an attachment component because the protection component is in direct contact with the rear surface area of the information storage component.

FIG. 2c illustrates a zoomed-in view of FIG. 2a and FIG. 2d illustrated a zoomed-in view of FIG. 2b, Both Figures include an example of an attachment component 31 for temporarily or permanently fastening the apparatus 20 to a host 21. The attachment component illustrated in FIGS. 2c and 2d is a "peel and stick" sticker.

FIG. 3 illustrates examples of how the writing surface of the apparatus 20 can be positioned with respect to a variety of different host locations. The apparatus 20 can be configured to be permanently or temporarily affixed to the host 21. As discussed above, hosts 21 can vary in terms of mobility, shape, size, and operating environment.

Figure 4A:
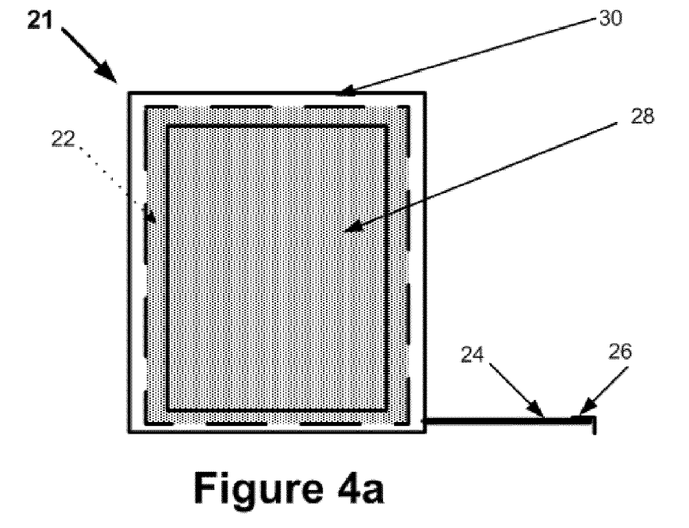
FIG. 4a is the front plan view of FIG. 1d that includes a hidden view of the housing component covered by the information storage component and the protection component.

FIG. 4a illustrates an example of how the information storage component 28 can be secured with respect to the housing component 22 of the host device and the protection component 30. FIG. 4a is identical to FIG. 1d except that FIG. 4a shows non-visible parts of the device 21, such as the housing component 22 and the information storage component 28.

FIGS. 6a and 6b illustrate cross section views of different storage component 28/housing component 22/protection component 30 configurations.

Figure 7:
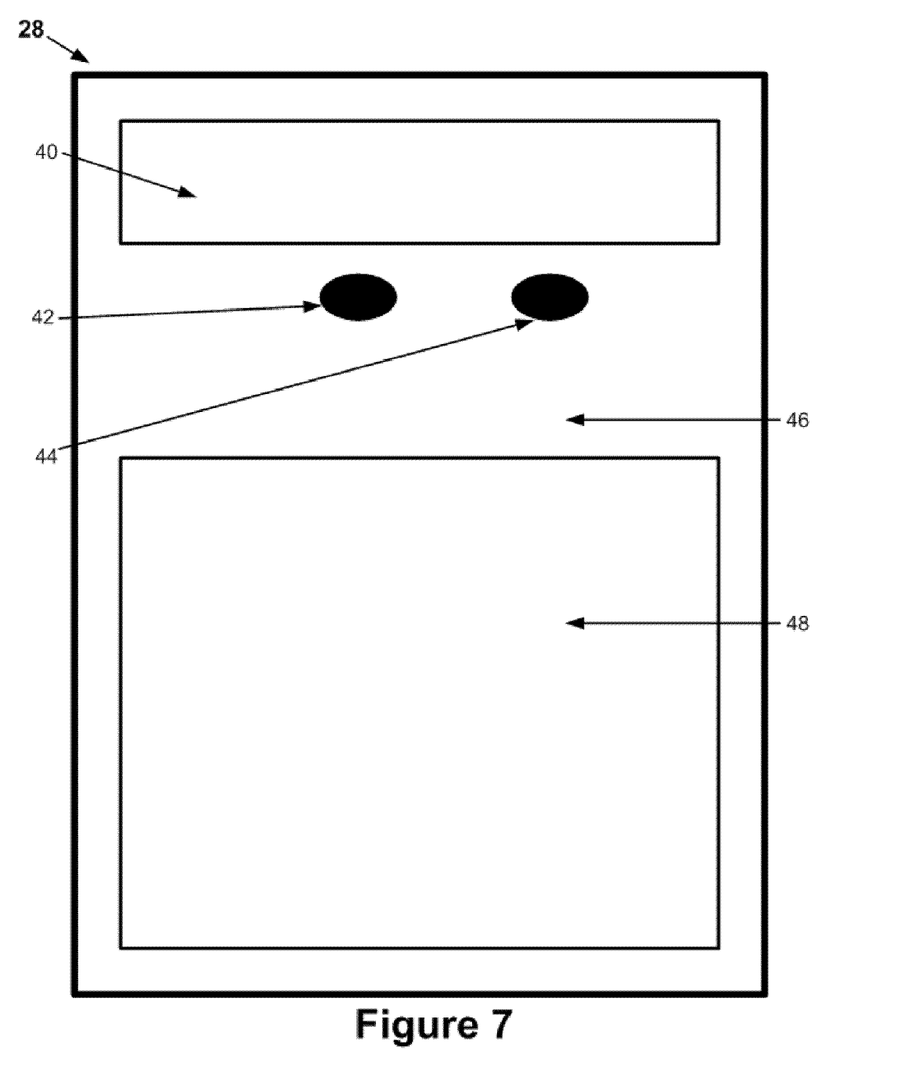
FIG. 7 is a block diagram illustrating an example of an information storage component that includes multiple information storage components.

Multiple information storage components 28 can be fastened to the same housing face, but this is often inefficient. FIG. 7 is an example of such a configuration. Multiple faces of the housing component 22 can each have their own information storage component 22. In some embodiments of the apparatus 20, all six surfaces of the housing component 22 (including even the front face) can each have their own information storage component 22.

In some embodiments (such as FIG. 6a), there is an inset 34 (i.e. cavity) within the housing component configured for placement of the information storage component 28. In other embodiments (such as FIG. 6b), there is no inset, and the information storage component 28 is simply fastened to the outer surface of the applicable housing component 22 face. A writing surface thickness 36 and a rim thickness 38 are illustrated in both the cross-sectional view of FIGS. 6a and 6b.

The side cross section views illustrated in FIGS. 6a and 6b both illustrate the protective nature of the protection component 30. The illustrated designs both preclude the information storage component 28 from touching an extended external surface if that surface is sufficiently flat. For example, as illustrated in FIGS. 6a and 6b, the rim could support the device 21 while preventing the writing surface from touching the ground (or the supporting surface if it is not the ground).

In order to protect the information storage component, the protection component 30 such as a rim, frame, or protrusion should extend at least a couple of millimeters away from the apparatus 20 than the information storage component 28. In many embodiments, the distance in position will exceed at least ⅛ of an inch, while in still other embodiments greater differences ¼ of an inch, ⅓ of an inch, ½ of an inch, ⅔ of an inch, ¼ of an inch, 1 inch, or more, depending on the size of the apparatus 20 and the likely operating environment for the apparatus 20. Similarly the thickness 36 of the information storage component 28 can range from mere millimeters to more than half an inch, depending on the desired context of use. The thickness 38 of the protrusions or rim can vary from a few millimeters to more than ½ an inch, or even in excess of an inch in certain contexts.

Figure 5A:
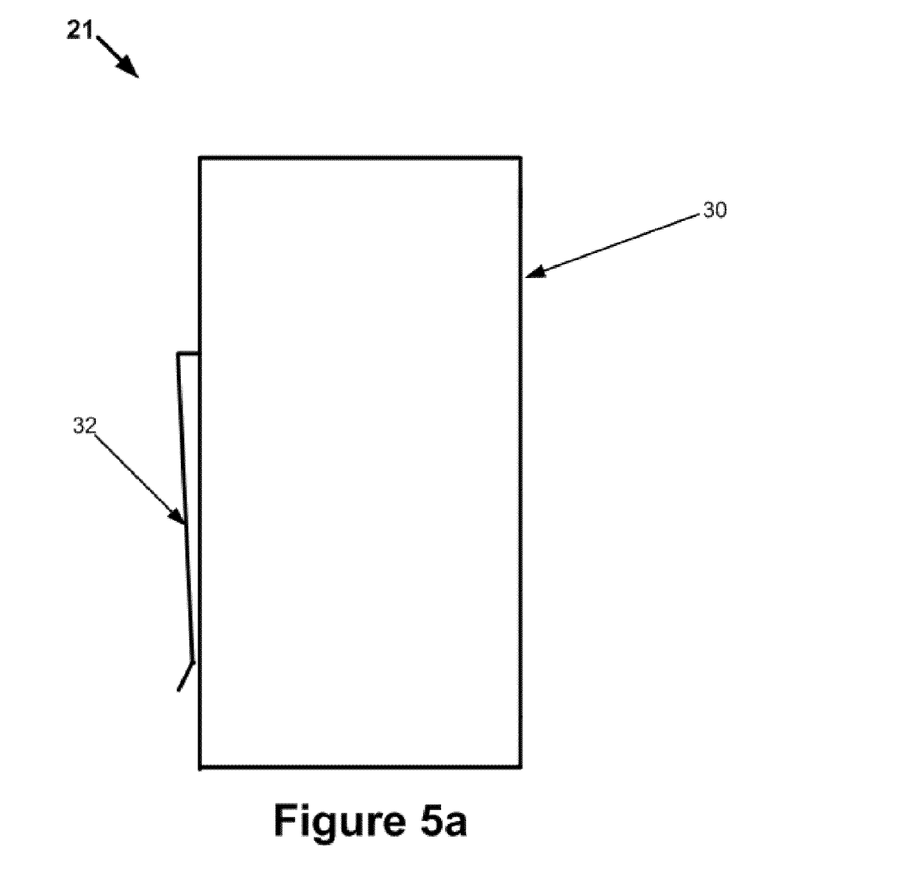
FIG. 5a is a rear plan view of a host tape measure device with an attached apparatus. A connection device is illustrated on one side of the apparatus and a protection component that comprehensively engulfs the rear face of the housing component is the only other component that is visible in the illustration.
Figure 5B:
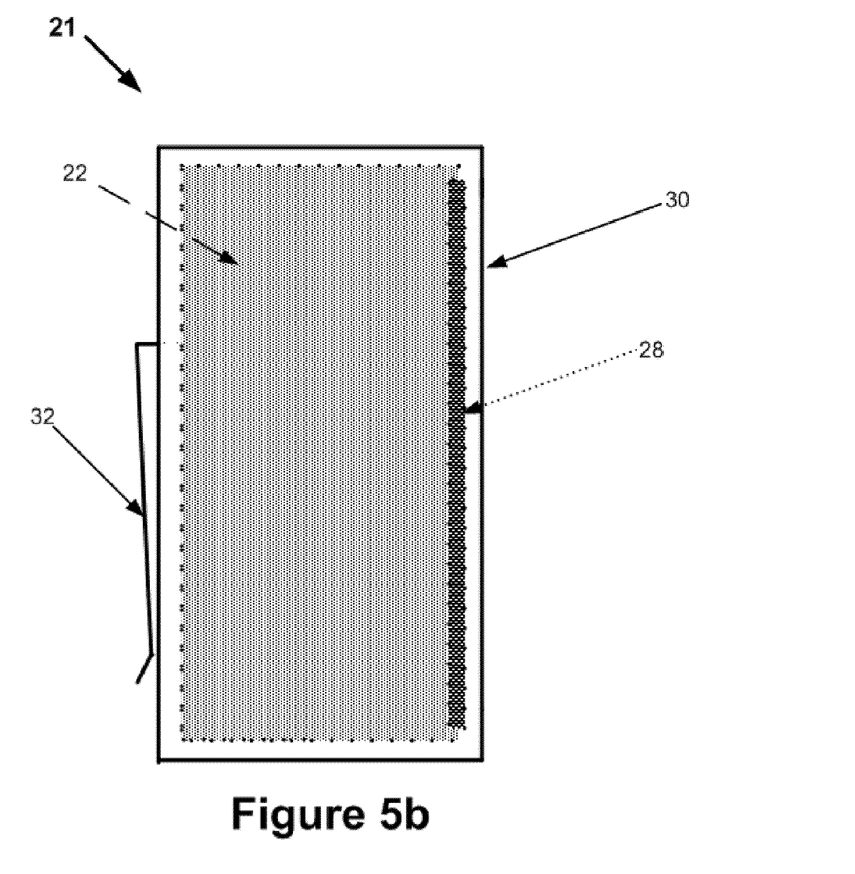
FIG. 5b is the rear view block diagram of the host tape measure device of FIG. 5a that includes a hidden view of the housing component and the information storage component covered by the protection component.

FIG. 5b also illustrates the hidden surface of the rear housing component 22 using a shaded surface illustration and a dotted arrow. FIG. 4a illustrates the side face of the housing component 22 that is blocked by the protection component 30 and the information storage component 28.

The rear face of the housing component 22 is also hidden from view in FIG. 5a. FIGS. 1d and 5a each disclose an embodiment of the apparatus 20 attached to a tape measure host 21 that uses a protection component 30 that covers all or substantially all, of the external surface of the apparatus 20 except for the information component 28.

FIG. 7 illustrates an example of an information storage component 28 that highlights the vast number of different components 28 that can be used in conjunction with the apparatus 20. An LED display 40 can use to display previously stored information, automated measurement readings, and other useful information. Users of the apparatus 20 have the option of using a microphone 42 to record measurements which can then be played back through a speaker 44. The information display component 28 can include a touch-sensitive touch screen that can provide users with a wide variety of options, including virtual keyboards, menu selections, icons, and action buttons. Areas on the information storage component 28 that are not utilized by electronic storage components can constitute more traditional erasable writing tablet surfaces. Wireless technologies, including but not limited to blue tooth connections, can be used to automatically communicate information to and from the apparatus 20.

In many embodiments of the apparatus 20, the information storage component 28 is an erasable writing surface that is either flat or substantially flat. In a preferred embodiment, the writing surface is comprised of either anodized metal (such as anodized aluminum) or thermoset plastic. In many embodiments of the of the erasable writing surface, the surface is adapted for displaying writing from a conventional pencil without smudging while simultaneously providing the attribute of being easily erased by the purposeful rubbing of the hand or finger of a human being.

In some embodiments of the writing surface, the writing surface is permanently fixed within a protection component 30 that includes a rubber jacket. As illustrated in FIG. 2a, some information storage components 28 will be in direct contact with an attachment component 31 while as illustrated in FIG. 2b, some information storage components 28 will not be in direct contact with an attachment component 31.

Some embodiments of the apparatus 20 can include a writing instrument holder and/or a tether attached to the apparatus 20 that is used to secure a writing instrument such as a pen or pencil with the apparatus 20. This is particularly important when the apparatus is used in operating environments where the user is unlikely to otherwise possess a writing instrument, such as an embodiment of the apparatus 20 used underwater by scuba divers.

In many embodiments of the apparatus 20 that involve a writing surface of anodized aluminum (such as 5005-H34 clear anodized aluminum), the desired thickness is about 0.04 inches.

2. Protection Component

A protection component 30 is the portion of the apparatus 20 that secures and protects the information storage component 28. In many embodiments of the apparatus 20, the protection component 30 is comprised of rubber. In some embodiments, the protection component 30 is a rubber jacket that either partially or fully envelopes the information storage component 28 except for the writing surface that is accessible to receive writing. In a preferred embodiment of the apparatus 20, the protection component 30 such as a rim protrudes outwards from the information storage component 28 and the information storage component 28 is not located within a recessed cavity in the apparatus 20.

In many embodiments of the apparatus 20, the rim is either permanently or temporarily attached to the writing surface (or other form of information storage component 28); with the rim protruding outward from the writing surface such at the rim can support the apparatus 20 on the ground with the writing surface touching the ground. In many embodiments, the rim is either continuous or substantially continuous. In such embodiments, the outward protrusion distance of the rim is uniform or substantially uniform.

The apparatus 20 can be configured to include one or more protection components 30. In many embodiments of the apparatus 20, the protection component is a "jacket" placed over the external surfaces of the housing component 22. In some embodiments, the protection component 30 is made of rubber or other similar flexible substance. Although the protection component 30 can provide protection to the housing component 30, the measuring tape 24, and the extraction/retraction mechanisms within the housing component 30, the purpose of the protection component 30 is to protect the information storage component 28 from being scratch, cracked, or otherwise damaged.

Some embodiments of the protection component 30 will include a continuous rim for frame in the same or parallel plane as the information storage component 28, but extending further in an outward direction so that if the apparatus 20 is dropped on the side with the information storage component 28, the information storage component 28 will not be damaged. Other embodiments of the protection component 30 will utilize one or more protrusions strategically placed around the information storage component 28 in place of a rim. In either case, the protection component 30 is designed to serve as a potential base of support for the apparatus 20 so that the information storage component 28 is untouched and undamaged by anything in the surrounding environment.

Figure 4B:
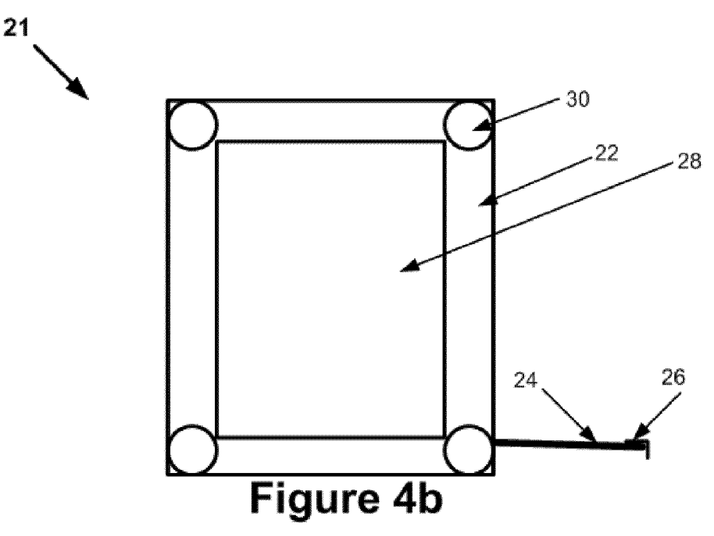
FIG. 4b is a front plan view similar to FIG. 1d, except that the protection component does not include a rim, but instead includes discrete cylindrical protrusions.

FIGS. 1a, 1b, and 1c illustrate examples of a rim embodiment of the protection component 28. FIG. 4b illustrates an example of a support post embodiment of the protection component 28.

FIGS. 2a, 2b, 2c, and 2d illustrate how a continuous rim as a protection component 30 can shield the information storage component 28.

The relative positioning of the surfaces of the housing component 22, the rim of the protection component 28, and the information storage component 28 is illustrated in FIGS. 6c and 6b are discussed above and below.

Some embodiments of the protection component 30 are configured to be removable by human users. Other embodiments of the protection component are configured to be permanently fastened to the apparatus 20 through the use of adhesives, clasps, fabric-based fastening tape (i.e. ®VELCRO), nails, screws, bolts, or any other suitable connection technology known in the prior art.

3. Attachment Component

An attachment component 31 is the mechanism by which the apparatus 20 is either permanently or temporarily fixed to the host location. In some embodiments of the apparatus, the apparatus 20 is provided to the user already attached to a particular host 21. In such environments, the attachment component 31 can be integrated with the protection component 30 such as a rim or jacket and the housing component 22.

Different host 21 and host environments can utilize different attachment components 31. Examples of potential attachment components 31 include a peel and stick sticker, a magnet, an adhesive, a snap, a button, a clasp, a hook, a fabric-based fastening tape (i.e. ®VELCRO), a nail, a screw, a bolt, a tape, or any other attachment technology that is known in the art.

III. Tape Measure Embodiments

The apparatus 20 was first conceived and implemented with the tape measure in mind as the host device 21. Any shape of the apparatus 20 can be temporarily or permanently affixed to the tape measure host device 21, but it is often desirable for the shape of the apparatus 20 to resemble the one of the exterior faces of the tape measure device 21.

Figure 8A:
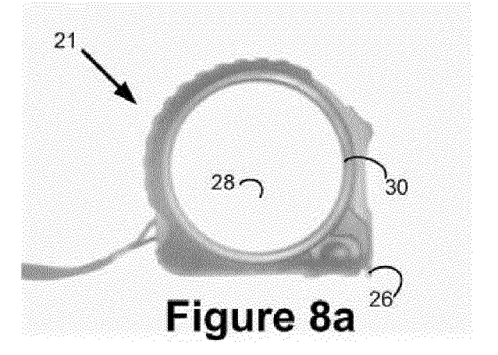
FIG. 8a is a front plan diagram illustrating an example of an apparatus permanently fixed onto a tape measure device.
Figure 8B:
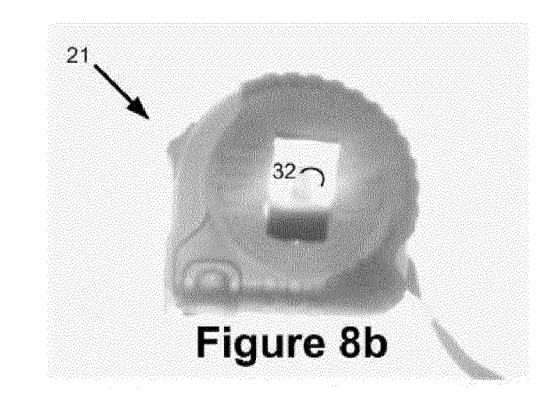
FIG. 8b is a rear plan diagram illustrating an example of an apparatus permanent fixed onto a tape measure device.
Figure 8C:
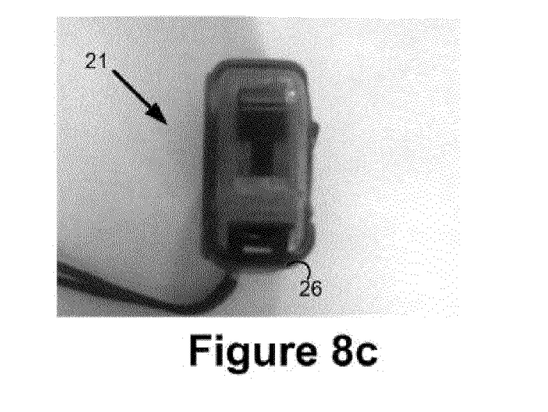
FIG. 8c is a side plan diagram illustrating an example of an apparatus permanent fixed onto a tape measure device.

FIG. 1d is a front view block diagram illustrating an example of a tape measure device 21 that includes an erasable writing tablet as an information storage component 28. FIG. 1d illustrates an embodiment of the apparatus 20 that is in the shape of a rectangular box as illustrated in FIG. 1c, but other shapes are possible. For example, FIGS. 8a-8c illustrates examples of a substantially circular shaped apparatus 20 and housing component 22.

A host tape measure device 21 can be configured using virtually any shape used by prior art tape measures. Many embodiments of the tape measure devices 21 will involve six surfaces, with at least one surface being substantially flat to serve as a bottom face so that the device 21 can be placed securely on the ground or some other substantially flat surface.

Most embodiments of an apparatus 20 that is either permanently or temporarily mounted to tape measure device 21 involve lightweight devices that can easily be lifted, moved, tilted, rotated and otherwise oriented to different positions and environments. Thus, the identification of a particular surface of the apparatus 20 as a front surface (or face), rear surface (or rear), top surface (or top), bottom surface (or bottom), or one of two side surfaces (sides) is arbitrary, depending on the current orientation of the device 21. For the sake of clarity with respect to the description below, the front surface of the device 21 refers to the face or surface of the device 21 from which the information storage component 28 is located and the rear face or surface refers to the opposite face or surface. Accordingly, the side faces or surface include the side out of which the actual tape measure 24 extends as well as the opposite side. Lastly, the bottom side or surface refers to the surface close to parallel with the tape measure 24 and the top surface or face refers to the opposite side.

A. Measuring Tape

The device 21 includes measuring tape 24 that is used to take measurements. FIGS. 1d, 3, 4a, and 4b illustrate examples of measuring tape 24 extending outwards from the tape measure device. The measuring tape 24 used in the device 21 can be of varying widths and lengths depending on the embodiment and the intended use of the device 21. For example, the measuring tape 24 could be a short as about 1 foot in length or have a length in excess of 100 feet, depending on the intended usage of the particular device 21. Similarly, the measuring tape 24 will often have a width of about 1 inch, but the width of the measuring tape 24 in a particular embodiment will depend on the intended usage, the length, and the materials comprising the measuring tape can also vary depending on the anticipated usage. For example, in some embodiments, the measuring tape 24 may be as wide as 1¾ inches or even exceed 2 inches and be particularly rigid, while in other embodiments the measuring tape 24 could more narrow than ¾ or even ½ of an inch while being remarkably flexible. The device 21 can be configured to utilize the full range and diversity of measuring tape 24 as taught in the prior art.

The measuring tape 24 can be comprised of a variety of different materials or combinations of materials. In some embodiments, a metallic measuring tape 24 is used to make the measuring tape 24 substantially rigid. In other embodiments, less rigid materials such as plastic or nylon can be used allowing the measuring tape 24 to be used to measure tight curves accurately.

Regardless of length, the measuring tape 24 has two ends. One end is fastened inside a housing component 22 and remains within the device 21 at all times. The other end of the tape 24 can be released, extracted out of the housing component 22, and then retracted back into the housing component 22 using a variety of different technologies known in the prior art. In some embodiments, the end of the measuring tape 24 that is not fixed within the housing component 22 can be attached to a tab 26 that remains outside the housing component 22 even when the measuring tape 26 is fully retracted within the housing component 22. Users can pull on the tab 26 to extract out the measuring tape 24. The tab 26 can also serve to prevent the unfastened end of the measuring tape 24 from retracting deep into the housing component 22, which could impede future actions to pull out the tape 24 in order to perform a subsequent measurement.

In some embodiments of the device 21, certain miniature magnetic or electronic components can be embedded directly onto the measuring tape 24 at various locations in order to facilitate automatic measurements through use of the device 21 itself. Automated measurement technologies for reading the tape 24 can rely on the tape 24 itself, the internal mechanisms for extending/retracting the tape 24, or both. With the use of an automated measurement technology, the user need not actually read the tape 24 in the conventional way, although they are free to confirm the results of the automated measuring technology. An embodiment of the device 21 that supports the automatic reading of measurements will likely include one or more electronic parts within the information storage component 28. Networking technologies and advanced processing algorithms can be used to build upon the data captured by the apparatus 20.

Different mechanisms to facilitate the release, extension, and retraction of measuring tape 24 with respect to apparatus 20 are well known in the art, and are not disclosed in the Figures. Such mechanisms are typically housed within the housing components 22 although instrumentation for locking the measuring tape 24 into place is typically located on the surface of the apparatus itself so that such instrumentation is accessible to the user.

It is possible for a single embodiment of the apparatus 20 to include more than one measuring tape 24 and more than one opening for measuring tape.

In some embodiments of the apparatus 20, the measuring tape 24 will be approximately 1 inch wide and be long enough to measure 25 feet.

B. Housing Component

A housing component 22 is comprised of the various connected surfaces that house the measuring tape 24 when the measuring tape 24 is within the apparatus 20. As discussed above, different technologies for facilitating the functionality of extending the measuring tape 24 from the apparatus 20, retracting the measuring tape 24 back to the inside of the apparatus 20, and otherwise manage the measuring tape 24 within the apparatus 20.

The housing component 22 and its various surfaces can be configured in a wide variety of different shapes and sizes, and can be constructed out of a wide range of different materials. In many embodiments, the design of the housing component 22 will be heavily influenced by decision decisions pertaining to the protection component 30 and in certain circumstances, the connection component 32.

The housing component 22 can be comprised of metal, fiberglass, plastic, wood, ceramic, rubber, and virtually any material that is rigid pr substantially rigid and capable of providing sufficient structural support to allow for the extraction and retraction of the measuring tape 24.

In the particular embodiment of the apparatus that is illustrated in FIG. 1d, the side face of the housing component 22 that would otherwise be visible, is hidden from view by the protection component 30 and the information storage component 28. Other embodiments of the apparatus 20, such as the illustration in FIG. 4d involve protection components 30 that are less comprehensive in their coverage over housing components 22 and thus the side face of the housing component 22 that is not covered by a protrusion of the protection component 22 or the information storage component 28 are visible in FIG. 4d. For embodiments in which the protection component 30 does cover provide comprehensive or substantially comprehensive coverage over the side surface of the housing component 22 (FIG. 1d) or the rear surface of the housing component (FIG. 4a), the applicable surface of the housing component 22 is not visible. FIG. 1b illustrates the hidden surface of the side housing component 22 using a shaded surface illustration and a dotted arrow. FIG. 5b also illustrates the hidden surface of the rear housing component 22 using a shaded surface illustration and a dotted arrow.

In a typical embodiment of the device 21, the only components of the apparatus 20 that are found outside the device 21 are the protection component 30, the information storage component 28, the connection component 32, and portions of the measurement tape 24 that are temporarily extracted outside the external surfaces of the apparatus 20.

FIGS. 1d, 4b, and 5b each illustrate in full or in part, a view of a surface of the housing component 22. The housing component 22 is also displayed in FIGS. 6a and 6b, both of which are discussed below and illustrate an example of a cross-section view as to how the surfaces for the housing component 22, the protection component 30, and the information storage component 28 can be configured.

C. Connection Component

A connection component 32 is a component of the device 21 that is temporarily or permanently connected to the device 21 for the convenience of the user.

Some embodiments of the device 21 will not include a connection component 32. Other embodiments will include at least one connection component 32. Still other embodiments may include more than connection component 32 and even more than one type of connection component 32. Examples of connection components include but are not limited to clips, belt clips, snaps, hooks, magnets, Velcro patches, straps, buttons, zippers, and virtually any other similarly suitable mechanism.

The use of a clip for a connection component 32 is illustrated in FIGS. 5a and 5b. The connection component 32 is often placed on a rear face opposite of the information storage component 28.

D. Other Components

The components of the apparatus 20 itself, such as the information storage component 28, the protection component 30, and the attachment component 31 are discussed above both generally and with respect to tape measure devices 21.

FIGS. 8a-8c illustrate additional examples of an apparatus 20 integrated with a tape measure device 21.

IV. Under Water Embodiments

The apparatus 20 can be implemented in the form of a removable strap as host 21 so that a scuba diver can use the apparatus 20 to write while under water. The apparatus 20 in such an environment can be shaped like a fat hot dog or submarine (although not typically round in shape) so that the user may strap (using a fabric-based fastening tape such as ®VELCRO) it to the forearm and it will be linear with the arm similar to what pro-quarterbacks wear. The raised rubber rim can have a one piece molded rubber tether to retain the pencil and some type of molded loop to secure the pencil. The apparatus 20 could also be tethered to the diver's waist if they choose not to wear it on the arm using an arm strap.

The bottom of FIG. 3 discloses an example of a strap device 21 that can host the apparatus 20. A wide variety of different shapes and configurations can be incorporated with the apparatus 20.

V. Customized Embodiments

The apparatus 20 can be implemented in a wide variety of pre-defined embodiments that are suited to common contexts. The apparatus 20 can also be implemented in a fully customizable manner, on a per-request basis. Aluminum is cut by laser so literally any shape can be used for the writing surface. The raised rubber rim can also be manufactured in virtually any shape or size.

VI. Alternative Embodiments

In accordance with the provisions of the patent statutes, the principles and modes of operation of this invention have been explained and illustrated in preferred embodiments. However, it must be understood that this invention may be practiced otherwise than is specifically explained and illustrated without departing from its spirit or scope.

The invention claimed is:

1. An apparatus adapted to be attached to an exterior surface, comprising:
    a writing surface comprised of an anodized metal, wherein said writing surface is at least substantially flat, and wherein said writing surface has an edge;
    a rim attached to said writing surface, wherein said substantially surrounds said edge; and
    an attachment component connected to a back portion of said apparatus, wherein said attachment component is adapted to fasten said apparatus to the exterior surface.

2. The apparatus of claim 1, wherein said writing surface provides for being written on using a conventional pencil and erased by the rubbing of human skin.

3. The apparatus of claim 1, wherein said attachment component is adapted to permanently fasten said apparatus to the exterior surface.

4. The apparatus of claim 1, wherein said rim is at least substantially continuous, wherein said writing surface is substantially circular in shape.

5. The apparatus of claim 1, wherein said rim is substantially continuous, wherein said rim includes an outward protrusion distance, and wherein said outward protrusion distance is substantially uniform.

6. The apparatus of claim 1, further comprising a rubber jacket, wherein said rubber jacket at least partially envelopes said writing surface, and wherein said rubber jacket comprises said rim, wherein said rim is at least substantially continuous.

7. The apparatus of claim 1, wherein said writing surface is about 1 millimeter in thickness.

8. The apparatus of claim 1, wherein said rim provides for being removed and separated from said writing surface.

9. The apparatus of claim 1, wherein said rim is comprised of rubber, wherein said rim is at least substantially continuous, wherein said rim does not include a post, wherein said rim includes a outward protrusion distance, and wherein said protrusion distance is substantially uniform.

10. The apparatus of claim 1, wherein said attachment mechanism is a peel and stick sticker.

11. The apparatus of claim 1, further comprised of a rubber jacket, wherein said writing surface is permanently fixed within said rubber jacket, and wherein said rubber jacket includes said rim.

12. The apparatus of claim 1, wherein said attachment component fixing said apparatus to the exterior surface does not fasten said writing surface to said rim.

13. The apparatus of claim 1, wherein said attachment component includes at least one of: (1) a magnet; (2) an adhesive; (3) a snap; and (4) a fabric-based fastening tape.

14. The apparatus of claim 1, wherein said writing surface is substantially in the shape of a circular disc.

15. The apparatus of claim 1, wherein said writing apparatus covers at least about 70% of the exterior surface of the housing component.

16. The apparatus of claim 1, wherein said writing surface provides for displaying writings made on said writing surface with a graphite pencil while said writing surface is under water.

17. The apparatus of claim 1, wherein said rim protrudes at least about ⅛ inches outward from said writing surface.

18. The apparatus of claim 1, wherein said attachment component provides for attaching said apparatus to at least one of: (a) a tape measure device; (b) an article of clothing; and (c) a mobile tool.

19. An apparatus adapted to be attached to an exterior surface of a mobile item, comprising:
   a jacket that includes an at least substantially continuous rim;
   a writing surface comprised of an anodized metal, wherein said surface is at least substantially flat and where said writing surface is secured at least partially within said jacket, and wherein said rim protrudes outwards from said writing surface; and
   an attachment component connected to a back portion of said apparatus, wherein said attachment component is adapted to fasten said apparatus to the exterior surface of the mobile item.

20. An apparatus adapted to be attached to an exterior surface of a housing component of a mobile tool, comprising:
   a rubber jacket;
   a writing surface comprised of an anodized metal; and
   a peel-and-stick sticker adapted to be fast a back portion of said apparatus to the exterior surface of the housing component to the mobile tool.

* * * * *